United States Patent
Lamant

(10) Patent No.: US 8,042,088 B2
(45) Date of Patent: Oct. 18, 2011

(54) METHOD AND SYSTEM FOR IMPLEMENTING STACKED VIAS

(75) Inventor: Gilles S. C. Lamant, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 911 days.

(21) Appl. No.: 11/965,712

(22) Filed: Dec. 27, 2007

(65) Prior Publication Data
US 2009/0172624 A1    Jul. 2, 2009

(51) Int. Cl.
*G06F 17/50* (2006.01)
(52) U.S. Cl. .................. 716/139; 716/100
(58) Field of Classification Search .......... None
See application file for complete search history.

(56) References Cited

U.S. PATENT DOCUMENTS

| 5,481,473 | A  | * | 1/1996  | Kim et al. ............... 716/111 |
| 5,604,680 | A  | * | 2/1997  | Bamji et al. ............ 716/118 |
| 5,731,986 | A  | * | 3/1998  | Yang ....................... 716/55 |
| 6,671,869 | B2 | * | 12/2003 | Davidson et al. ....... 716/117 |
| 6,910,200 | B1 | * | 6/2005  | Aubel et al. ............ 716/102 |
| 7,024,652 | B1 | * | 4/2006  | McGaughy et al. .... 716/115 |
| 7,334,206 | B2 | * | 2/2008  | Dinter et al. ........... 716/123 |
| 7,409,666 | B2 | * | 8/2008  | Almeida et al. ........ 716/137 |
| 7,555,739 | B1 | * | 6/2009  | Ginetti et al. .......... 716/119 |

* cited by examiner

*Primary Examiner* — Leigh Garbowski
(74) *Attorney, Agent, or Firm* — Vista IP Law Group, LLP

(57) ABSTRACT

The invention is directed to a method, computer program product and apparatus for a body of code to specify how database elements are combined to create a complex element, a database grouping is created that receives the content of the evaluation without introducing a level of hierarchy, and provides graphical user interface (GUI) to interactively manipulate the element.

14 Claims, 12 Drawing Sheets

700

100

300

600

730

METHOD AND SYSTEM FOR IMPLEMENTING STACKED VIAS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to design implementations, and in particular, to Integrated Circuit (chip) design.

BACKGROUND

Certain semiconductor manufacturing processes allow for the usage of stacked vias. Such physical structures usually require the definition of specific rules between the different elements of the stack. Typical examples of such rules include requirements on the way shapes of cuts are stacked within a via and the minimal area rules for the intermediate routing layers of the via for the intermediate levels in the stack.

Automated place and route tools can fulfill these requirements by selecting one solution in the domain spaces of the different parameter combinations. However, in the custom circuit design area, it is not uncommon for the physical layout designers to want to control each individual parameters of the stack. There are two conventional implementations. First is a parameterized cell (PCell) approach, where an "instance" of the via is created, while a design language is used to manage the creation of the shapes within the instance master. Second is a manual approach, where the designer layouts a stack of vias and crafts each via individually by tuning the parameters of the via.

FIG. 1 illustrates a stacked via. This stacked via 100 has four layers, going from bottom layer 110 to a first intermediate layer 120, to a second intermediate layer 130 and a top layer 140. There is also an array of 2×2 cuts between each layer 115, 125, 135. Array 115 is in between bottom layer 110 and first intermediate layer 120. Array 125 is between the first intermediate layer 120 and the second intermediate layer 130. Array 135 is located between the second intermediate layer 130 and the top layer 140.

FIG. 2 illustrates a stacked via with and extended intermediate layer. This stacked via 200 is similar to the stacked via of FIG. 1. It also has four layers, going from bottom layer to top layer 210, 220, 230, 240, with an array of 2×2 cuts between each layer 215, 225, 235. Intermediate layer 220 has a process rule requiring a minimum area, which is larger than what the regular cut overlap rule defines for this specific layer. In such case, the user must adjust the area to be larger. Stretching one edge of the intermediate layer 220 can do this. Routing tools use pre-defined combination of MAR via that stretch in the direction perpendicular to the routing direction for that layer.

FIG. 3 illustrates a stacked via that precludes the overlapping of cuts. This stacked via 300 is similar to the stacked via of FIG. 1. It also has 4 layers, going from bottom layer to top layer 310, 320, 330, 340, with an alternate array of cuts between each layer 315, 325, and 335. Each layer includes 2 cuts, and the cuts alternate such that successive cut layers have cuts that are rotated 90 degrees. In other words, no cuts are located immediately above or below another cut.

FIG. 4 illustrates another stacked via that precludes the overlapping of cuts. This stacked via 400 is similar to the stacked via of FIG. 3. It also has 4 layers, going from bottom layer to top layer 410, 420, 430, 440, with an alternate array of cuts between each layer 415, 425, and 435. In FIG. 4, the cut layers are shifted 90 degrees with respect to the top layer 440 and bottom layer 410.

The stacked vias of FIGS. 3 and 4 result from process rules precluding the overlap of cuts in the stacked via. Stacked vias of FIGS. 3 and 4 are useful when design rules violate the design in FIG. 2 above. There are several different solutions that can be created by the custom designers, some of which may be allowable by the rules in some processes while others may not. Alternate arrays of FIGS. 3 and 4 are common choices, but some processes also allow straddling via cuts. Some are dictated by the process rules, others depend on the surrounding shapes, or considerations understood only by the person creating the layout.

In a PCell approach, an "instance" of a via is created. The PCell may be written for OpenAccess (OA) in a non-proprietary language such as C++ and/or Python. A collection of parameters associated with the PCell allows the designer to control the intermediate plates and cuts, while the PCell coder made sure that the process rule are enforced in the actual code. In a manual approach, the designer provides layouts including stack of vias and crafts each of them individually by tuning the parameters of the via instance. These two approaches have many drawbacks.

First, the PCell approach is not "interoperable". The stack only exists in the tool virtual memory (VM) space, which is evaluated by the design language used to describe the PCell super-master. The stack is embedded within a level of hierarchy. This embedding prevents the routing tools from being able to interact or connect with the intermediate levels of the stack.

Furthermore, in OA, the PCell approach does not allow parameterization of the top and bottom layers of the stack. In OA, although it is possible to "bind" a PCell supermaster to a via definition, by construction, an OA via definition requires a fixed top and bottom layers. The PCell master is linked to a customViaDef in the OpenAccess technology database, defining the two predefined top and bottom access point into the via object. Such PCell master does not have parameterized top and bottom layer names.

Even if the PCell itself contains all the intermediate interconnect shapes, these are not visible to the routing applications in OpenAccess.

--- customViaDef(
    (viaDefName topLayer bottomLayer lib cell view)
)

---

FIG. 5 illustrates a stacked via in OpenAccess (OA) using the PCell approach. This stacked via 500 has 4 layers, going from bottom layer to top layer 510, 520, 530, 540, with an alternate array of cuts between each layer 515, 525, 535. This structure is stored together as a Pcell.

On OA, the PCell approach does not allow parameterization of the stack layers 520, 530. In OA, although it is possible to "bind" a PCell supermaster to a via definition, by construction, an OA via definition requires a fixed top 540 and bottom 510 layers.

```
customViaDef(
    (viaDefName topLayer bottomLayer lib cell view)
)
```

Second, the manual approach is not user friendly, and requires the end user to manually create each individual levels of the stack. The user has to remember all the interlevel rules. There is no notion for visualizing the stacked via as a whole. It has to be created by all discrete objects using editors. Therefore, the manual approach can not provide assistance in recognizing that assemblage as a special object.

SUMMARY

In one embodiment, a body of code is defines to specify how database elements are combined to create a complex element. Another embodiment includes creating a database grouping that receives the content of the evaluation without introducing a level of hierarchy. In another embodiment, graphical user interface (GUI) is provided to interactively manipulate the objects.

In one embodiment, the proposed solution includes the definition a new technology object that describes the rules and cross level relationships for the assemblage of individual via. This object includes a set of formal parameters, defined by the system, user defined parameters to drive the cross level relationships, a body of code that will return a list of configured OpenAccess viaDefs, and the creation, in the design database, upon evaluation of the body of code in the corresponding technology database, of a grouping of via, without the introduction of an extra level of hierarchy.

In another embodiment, set of GUI is used to enable the user to interactively manipulate such objects.

In another embodiment, the generator code is only used at the time the stack is interacted or created allowing the database to be interoperable as it does not require the generator code to be opened.

In another embodiment, the stack is seen as a single object from the user perspective, while still being built of the basic elements required for the routing tools to deal with it.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

Figure 1:
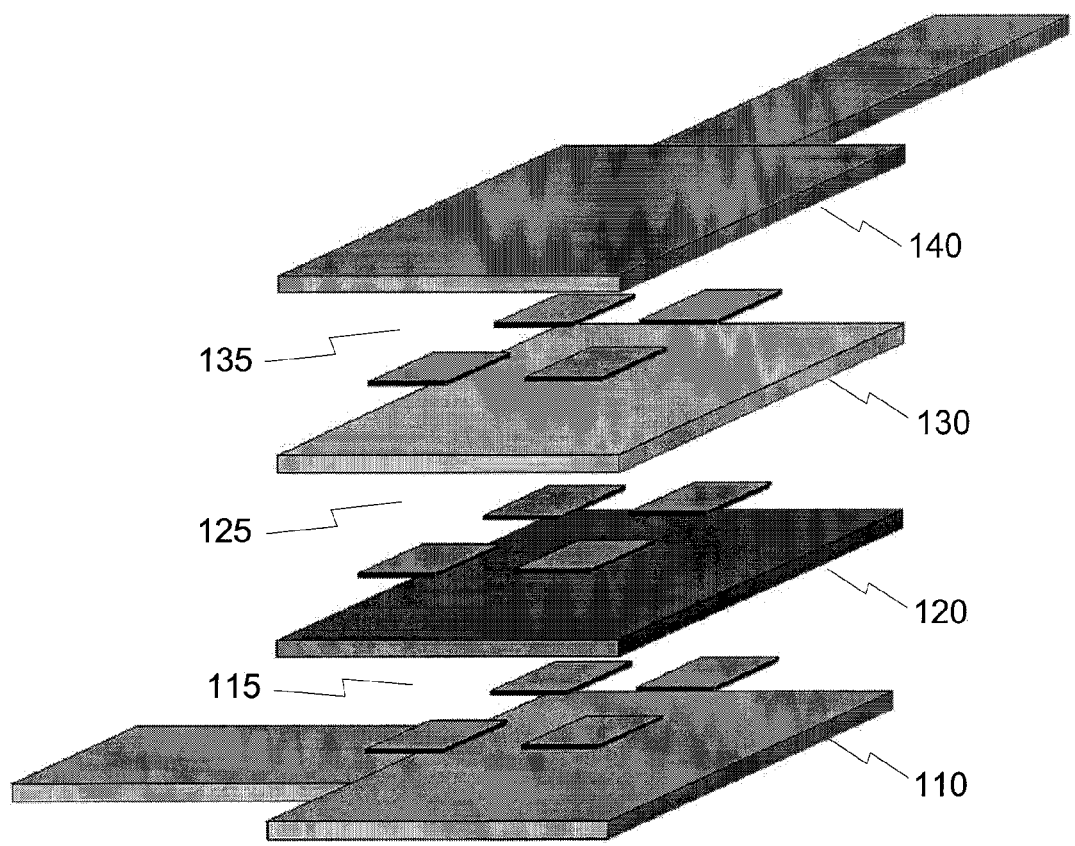
FIG. 1 illustrates a stacked via.
Figure 2:
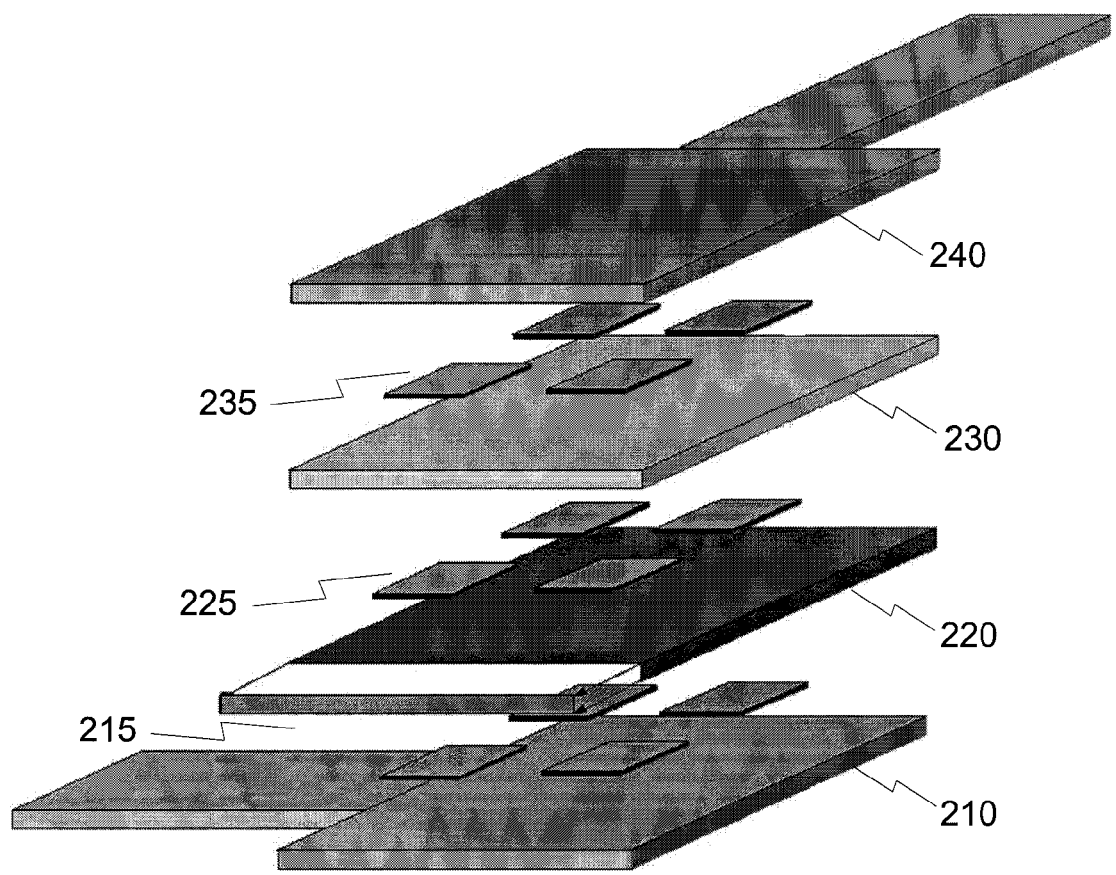
FIG. 2 illustrates a stacked via with and extended intermediate layer.
Figure 3:
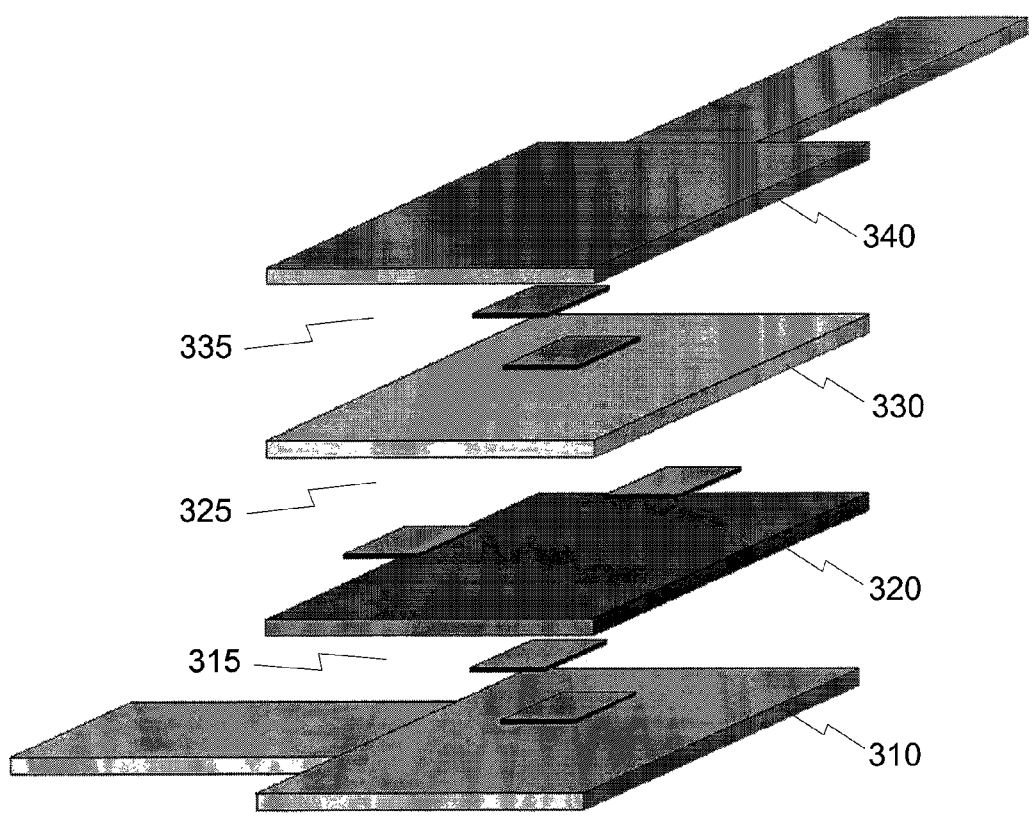
FIG. 3 illustrates a stacked via that precludes the overlapping of cuts.
Figure 4:
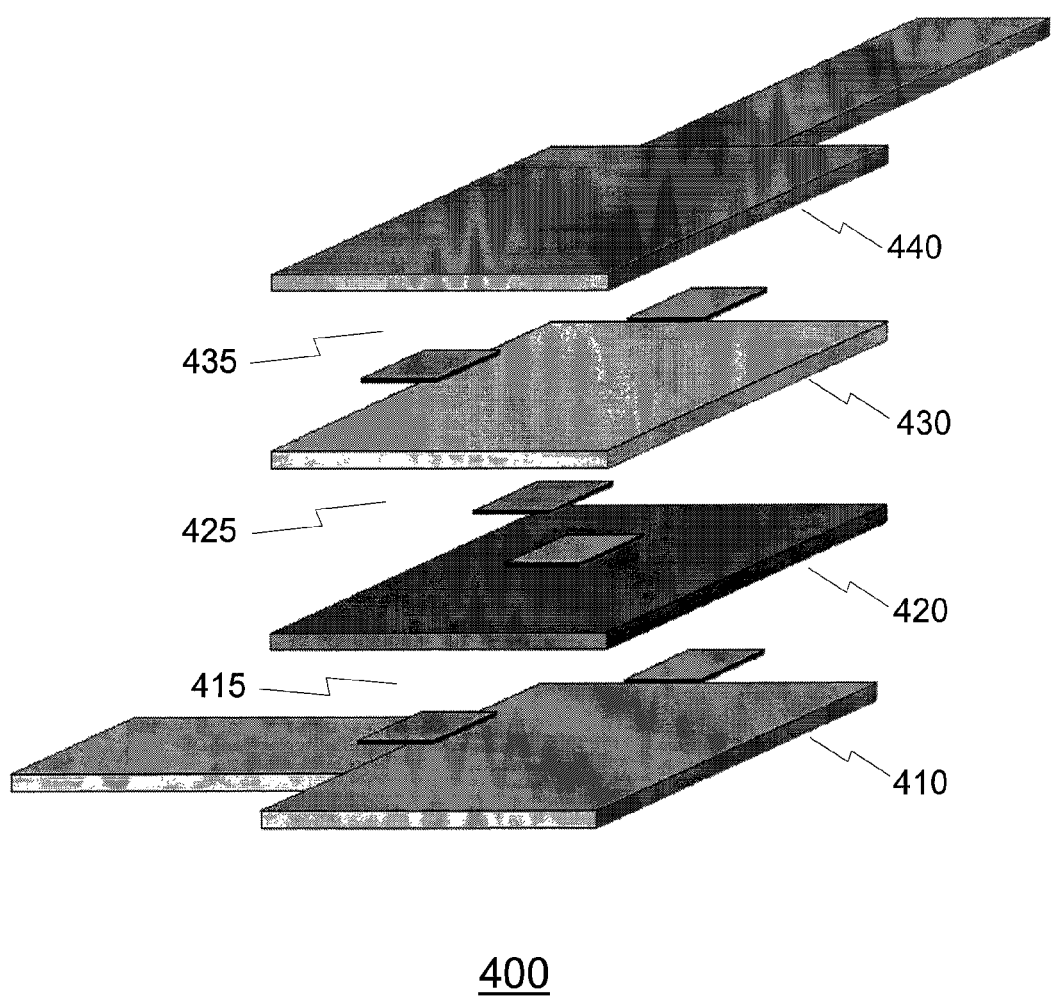
FIG. 4 illustrates another stacked via that precludes the overlapping of cuts.
Figure 5:
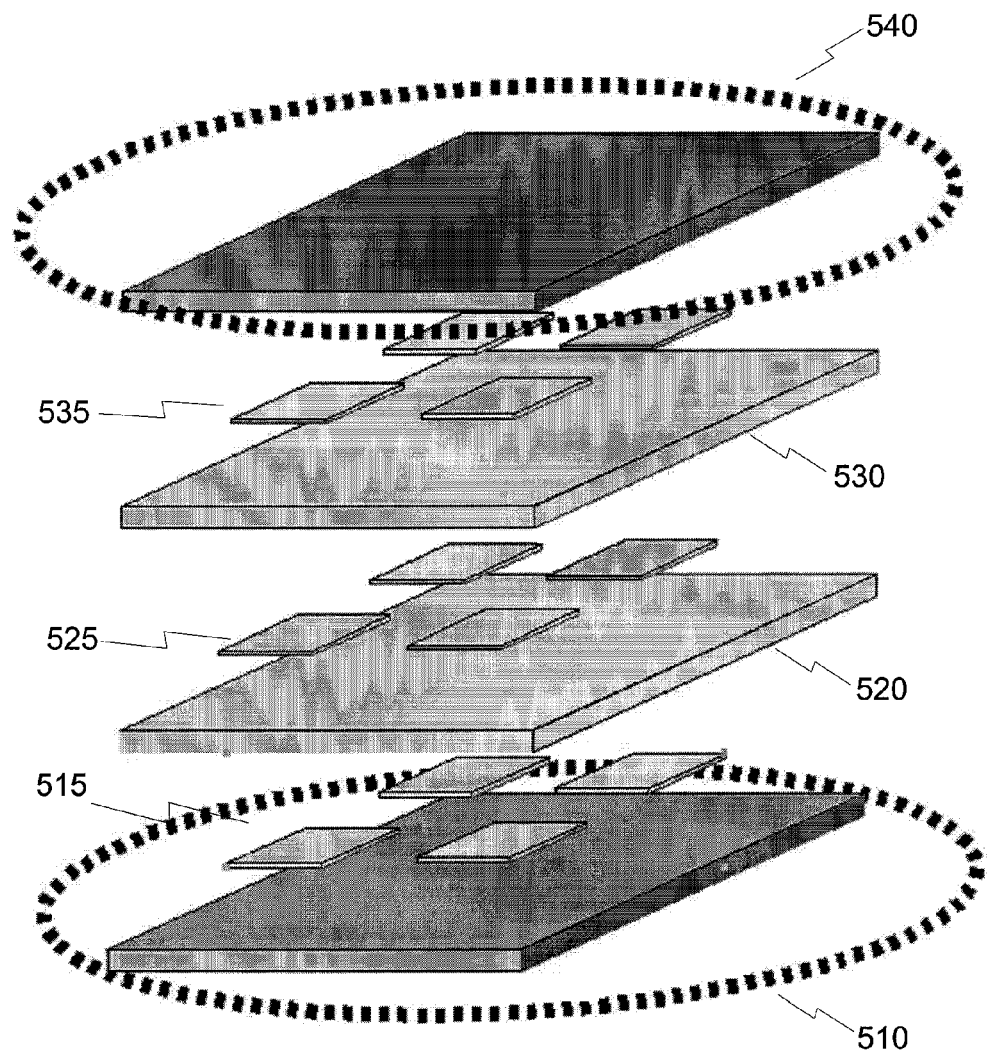
FIG. 5 illustrates a stacked via in OpenAccess using the PCell approach.
Figure 6:
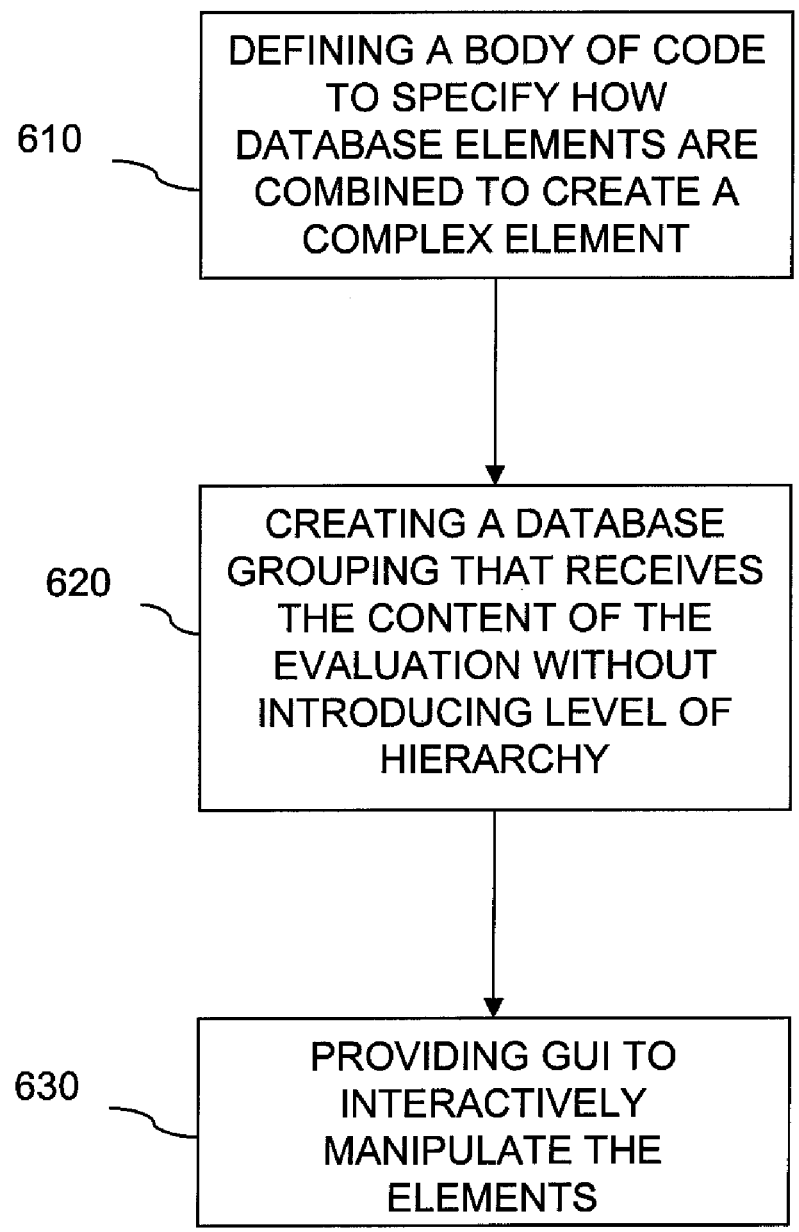
FIG. 6 depicts a flow diagram for a general overview according to an embodiment of the present invention.

FIG. 6 depicts a flow diagram 600 for a general overview according to an embodiment of the present invention. Code may be defined for complex database elements, which creates a grouping of elements. A graphical user interface (GUI) may be provided to interactively manipulate the elements.

At 610, a body of code is defined to specify how database elements are combined to create a complex element. Each element may be evaluated to perform its function. At 620, a database grouping is created that receives the content from the complex elements of the evaluation without introducing level of hierarchy. At 630, graphical user interface (GUI) is provided to interactively manipulate the code.

Figure 7:
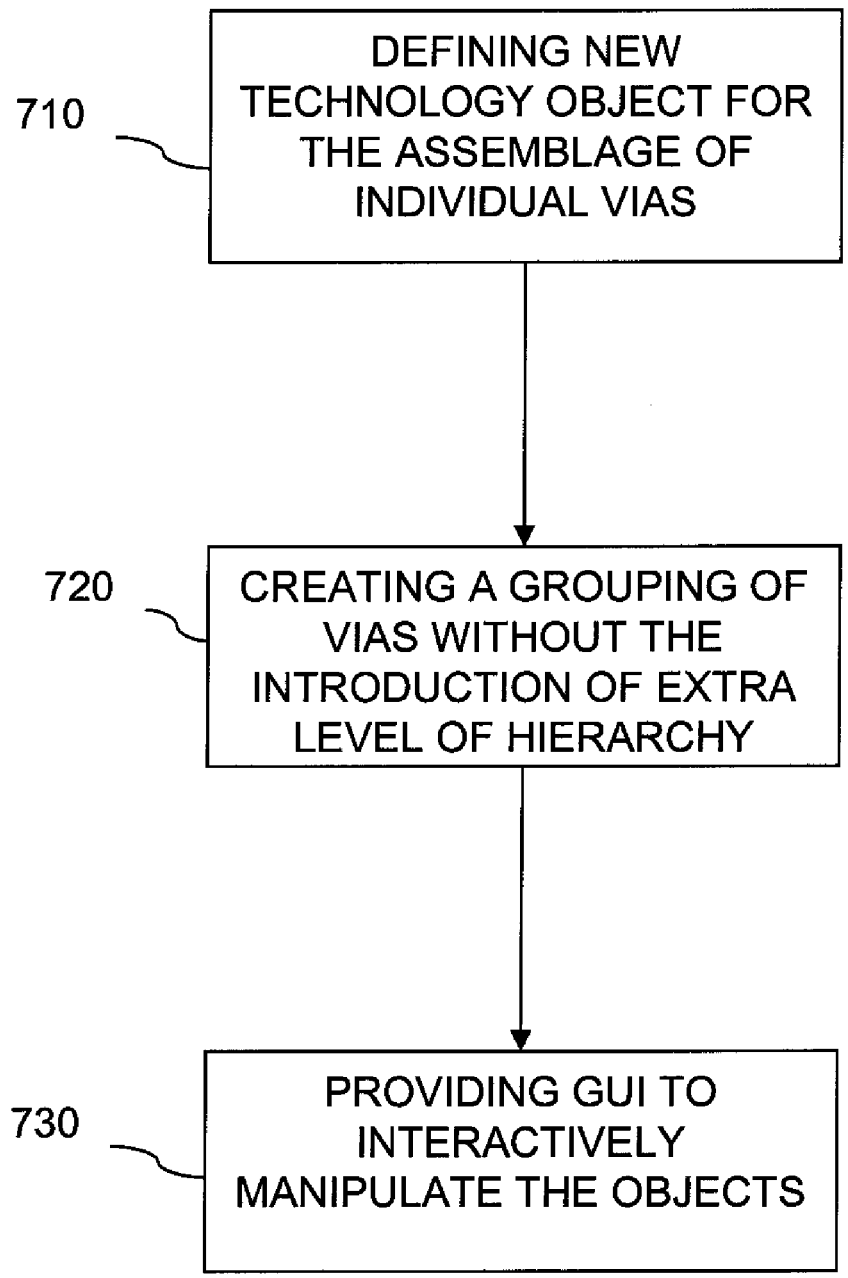
FIG. 7 depicts a flow diagram for stacked vias according to an embodiment of the invention.

FIG. 7 depicts a flow diagram for stacked vias according to an embodiment of the invention. Stacked vias may be implemented by defining objects for vias, creating parameterized groups, and optionally providing a GUI for the user to interactively manipulate the objects.

At 710, new technology object is defined for the assemblage of individual vias. The definition may include a new technology object that describes, in a user chosen language, the rules and cross level relationships for the assemblage of individual vias. The objects may be stored in a technology database. The objects may include a plurality of parameters. For example, this object may include a set of formal parameters, defined by the system; user defined parameters, to drive the cross level relationships; and a body of code, that will return a list of configured OpenAccess viaDefs. In some embodiments, the generated code for the new object is only used at the time the stack is interacted or created; thus, allowing the database to be interoperable. As a result, it does not require the generator code to be opened all the time. The generated code may be edited in any editors such as in the Virtuoso editor.

At 720, a grouping of vias (e.g., viaStack) is created without the introduction of an extra level of hierarchy. The stack, in the design database, upon evaluation of the body of code in the corresponding technology database, of a grouping of vias, may be created without the introduction of an extra level of hierarchy. The stack may be seen as a single object from the user perspective, while still being built of the basic elements required for the routing tools to deal with it. In effect, it achieves the benefit of hierarchy grouping without installing a real hierarchy in the design.

At 730, GUI is provided to interactively manipulate the objects. In one embodiment, the GUI is provided with the editor. Because the viaStack is embedded into a group, the editor may recognize the viaStack as a single element rather than its individual elements. In other words, move and/or stretch commands from the editor may be applied to the viaStack rather than each individual element. In another embodiment, the parameters controlling the viaStack are available to be viewed and modified by the user. The user can specify different values for the parameters. When such values are entered, a call back code associated with the given parameters is called, computed and data validation is performed.

Figure 8:
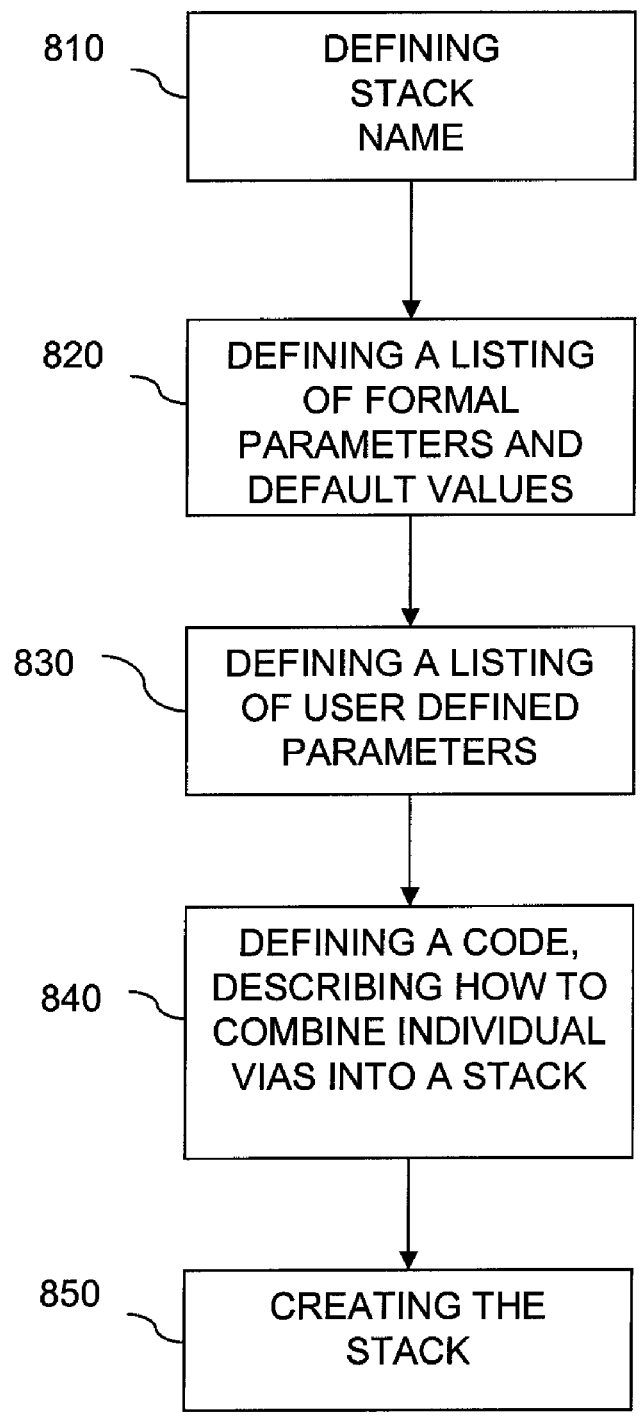
FIG. 8 depicts a flow diagram for defining new object according to an embodiment of the present invention.

FIG. 8 depicts a flow diagram 800 for defining new object according to an embodiment of the present invention. The object is defined to capture in a programming language of the intrinsic relationship between the different levels in the stacks, as well as how to use the user specified parameters to generate them. For example, the object may be named viaStackDef. In some embodiments, in Virtuoso, SKILL is used. In other embodiments, other languages may be used as appropriate. In addition, a predefined set of parameters, used by the application during the stack creation process may also be used.

At 810, a stack name is defined. At 820, a listing of formal parameters and default values are defined. In some embodiments, these are predefined by the editor, and include for example, the top and bottom layer name parameters, the width and direction of the top layers. At 830, a listing of user-defined parameters is defined. In some embodiments, these parameters may include cut patterns. Some other parameters may include a parameter name; a parameter default value; and a parameter type and callback. The parameter type and call back may be specified in a different location, in a way similar to how the Component Description Format (CDF) works, and associated by a couple to this parameter. In some embodiment, the couple includes fields for technology name / stack name. In another embodiment, callback is a piece of code, that may be used to validate a given user input, or may be used to compute a different parameters based upon a combination of entered parameters.

A body of code describes how to combine individual OA viaDefs into a stack (840). The code itself does not have to actually create the via objects in the design database, but rather return a list of (e.g., viaDefName [parameters]) that will enable the editor to create the stack (850) at the user'S demand.

Figure 9:
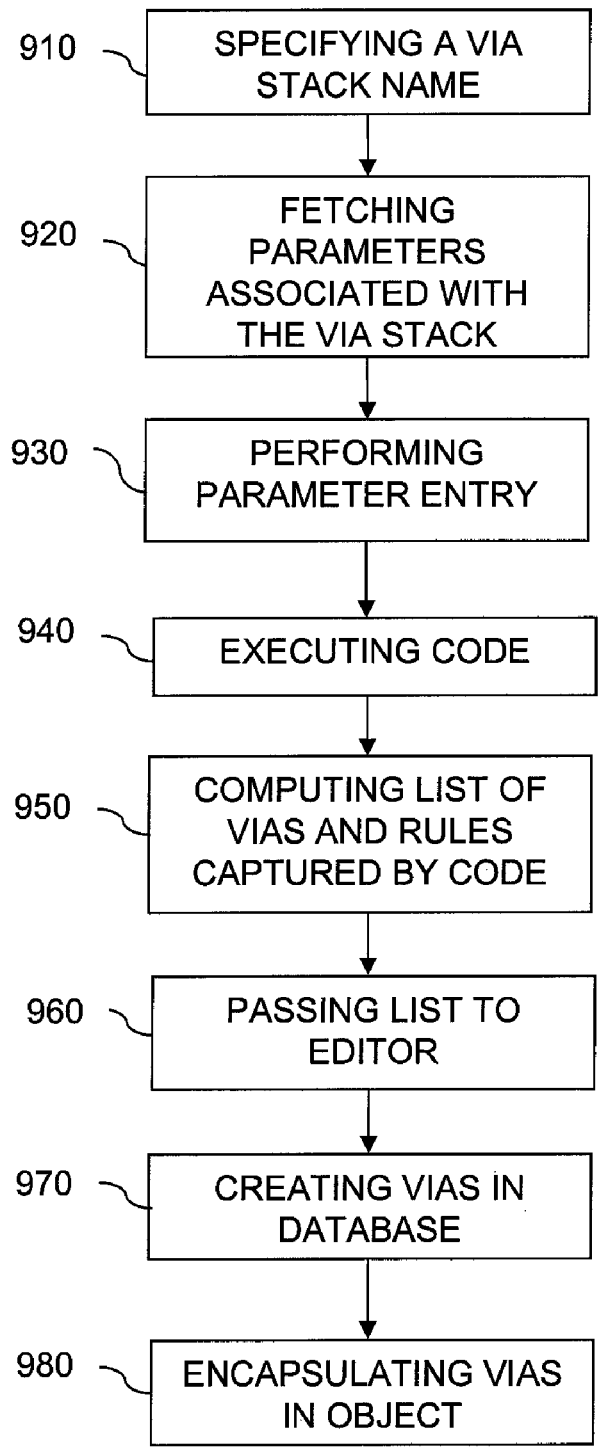
FIG. 9 depicts a flow diagram for creating a database grouping according to an embodiment of the present invention.

FIG. 9 depicts a flow diagram 900 for creating a database grouping according to an embodiment of the present invention. In one embodiment an editor is used to create the grouping. For example, the grouping may be a via stack. The group may be defined as viaStack. In another embodiment, the editor is a virtuoso layout editor. Any editor compatible with the system may be used.

At 910, a via stack name is specified. In some embodiments, the user is prompted to specify the via stack name. In other embodiments, the via stack name is automatically generated. Any method may be used to specify the stack name. At 920, parameters associated with the via stack is fetched. In one embodiment, based upon the viaStack name, the editor fetches from viaStack definition. In another embodiment, the editor displays the name in a GUI the different parameters associated with the via stack definition. At step 930, parameter entry is performed. At step 940, the code is executed. In some embodiments, once the user complete the parameter entry, the body of code associated with the via stack definition is executed. At step 950, list of vias and rules captured by the code is computed. In some embodiment, the list of OpenAccess viaDefs, with their associated parameters is computed according to the specified parameters and the rules captured by the code. At step 960, the list of vias and rules is passed to the editor. At step 970, the vias are created in the database. At step 980, the vias are encapsulated in object. In some embodiments, the vias are encapsulated in an OpenAccess figGroup object, specially identified for that purpose.

In some embodiments, when the editor is asked to select a viaStack, it may handle it as a single object, since Virtuoso Layout editor is able to deal with certain design objects as a group. Using the specific type, specific actions related to the handling of the viaStack may take place. In other embodiments, the "Query Property" command displays a specialized GUI that will allow the user to see the formal and custom parameter sets, as well as executes the corresponding callbacks to control user entry validity.

Figure 10:
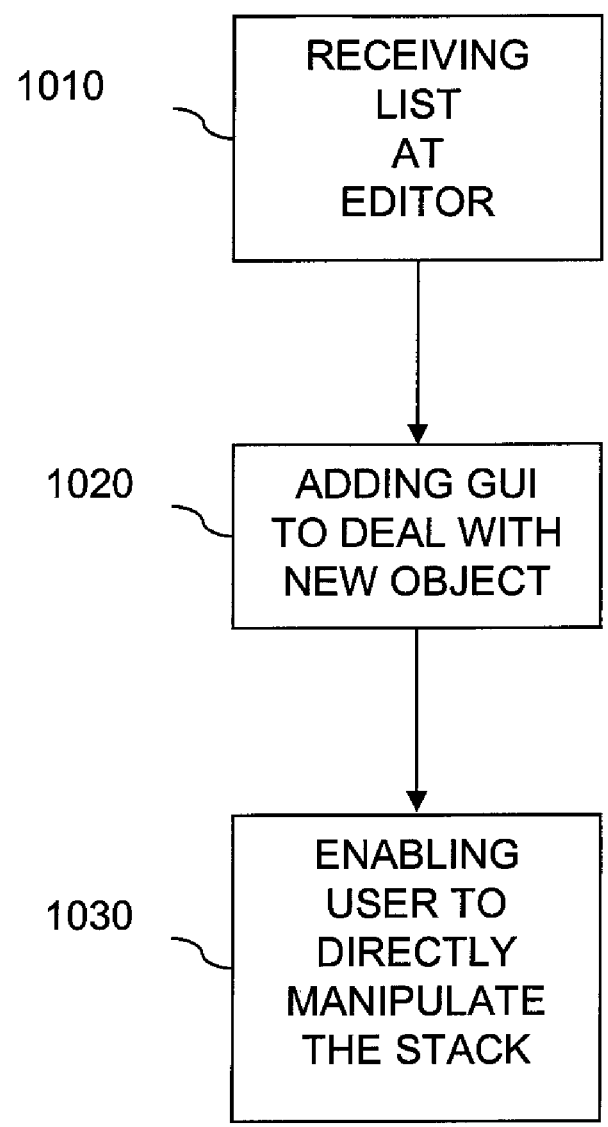
FIG. 10 depicts a flow diagram for providing graphical user interface (GUI) according to an embodiment of the present invention.

FIG. 10 depicts a flow diagram for providing graphical user interface (GUI) according to an embodiment of the present invention. Wherever the current editor deals with Vias, new GUI may be added to deal with the new object "viaStack" and enable the user to directly manipulate the stack.

At 1010, the list of vias and rules is received at the editor. At 1020, GUI may be added to deal with the new object. The property editor has customized view based upon the type of object that is being edited inspected. Since the viaStack has been wrapped into a database group of a pre-defined type, it is possible to create a specific GUI associated to that type. Since that GUI is associated to the group type, it is also possible to make that GUI sensitive to the existence of predefined parameter and user defined parameters in the Component Description Format (CDF) for the viaStack. This information may be displayed to the user.

At 1030, user is able to directly manipulate the stack. In the GUI described in 1020, all the parameters controlling the generation of the viaStack are exposed. The user can then thru this GUI, specify different values for the parameters. When such a value is entered, the callback code associated with the given parameter is fired, and data validation for that field is performed, and any derived fields or/and parameters are computed. When the user clicks on the "OK" (or APPLY) button of the GUI, the body of code responsible for generating the content of the group (in this case the viaStack) is being invoked, and is passed the set of defined parameters, as defined in the GUI, resulting in the viaStack being re-evaluated according to the new set of parameters. Additionally, because the viaStack is embedded into a group, it is possible for the editor selection algorithm of the associated editor to recognize the viaStack as a single element rather than its individual components. Thus, later Move / Stretch commands from the editor may be applied to the viaStack rather than to each individual via objects.

Figure 11:
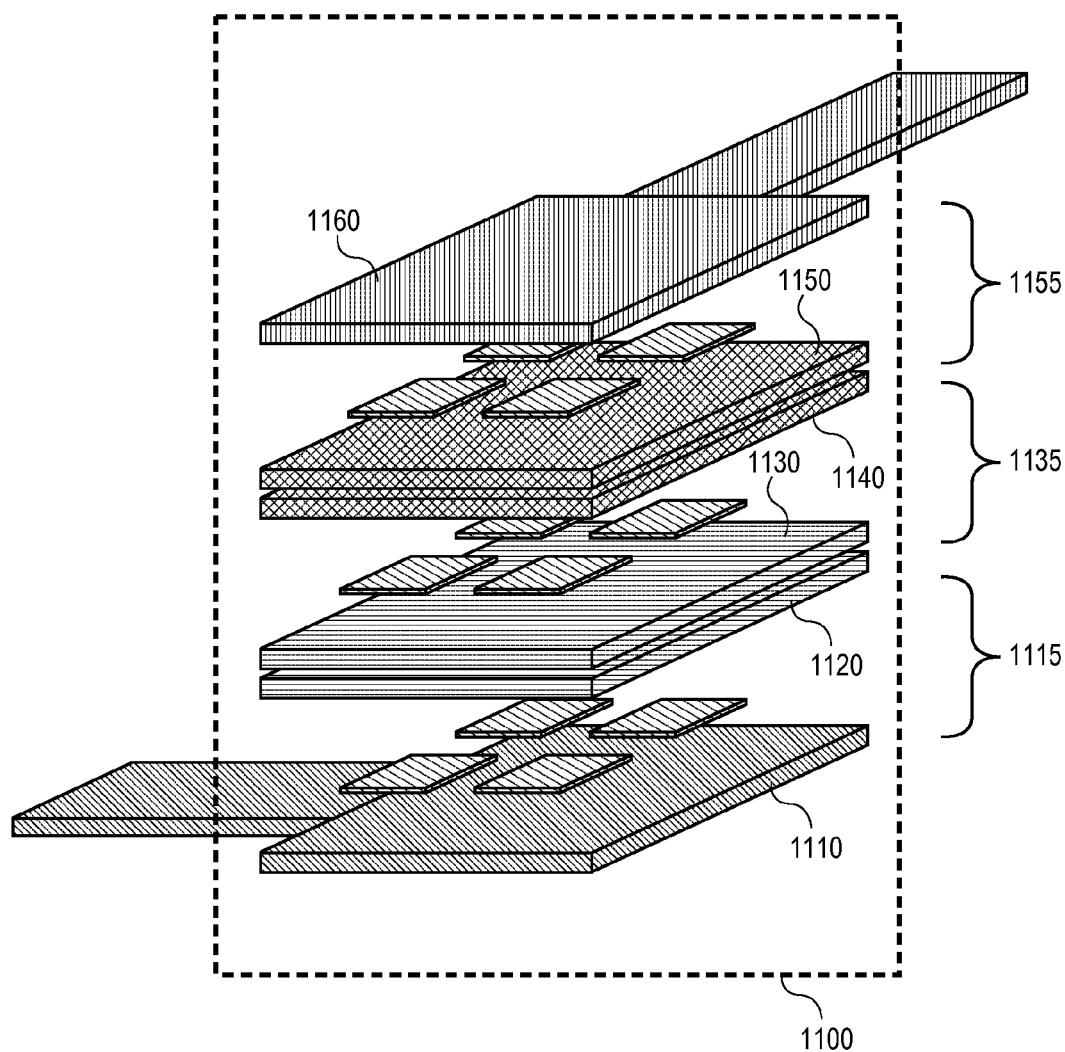
FIG. 11 illustrates a stacked via according to an embodiment of the present invention.

FIG. 11 illustrates a stacked via 1100 according to an embodiment of the present invention. This stacked via 1100 has 6 layers, going from bottom layer to top layer 1110, 1120, 1130, 1140, 1150, 1160 with an alternate array of cuts between layers with via1 1115 between layers 1110 and 1120, via2 1135 between layers 1130 and 1140, and via3 1155 between layers 1150 and 1160.

In some embodiments, the design database created using this generator is fully OA interoperable. Although the language used to describe the actual rules for generating the stack maybe proprietary to the editor used, the resulting stack is what is stored in the OA database and, therefore, may be seen by any third party tools.

In some embodiments, the design database created using this generator is compatible with all existing Routing tools. Because it does not introduce an extra level of hierarchy to represent the stack, all the intermediate layers of the OA via objects are visible to the user and may be connected to by a router.

In some embodiments, while FIG. 11 shows what may be seen by the same application, when the individual vias (via1, via2, via3) are wrapped by a viaStack type of the editor. In other embodiments, the duplicated top/bottom intermediate layers are merged during the "tape-out" process (i.e., same layer).

In some embodiments, the construction of specialized GUI's and functions in the editor allows for a more user-friendly experience and manipulation of the stack as it groups the individual elements of the stack into a single group.

In other embodiments, the process may include associating a body of code and a set of parameters to generate a level 0 type of grouping with other types of database objects. The ability for the editing environment to recognize that association allows the end user to interactively deal with all the elements of the group, in a manner that is controlled by the body of code, or if in other embodiments, directly with the actual elements within the group independently. In further embodiments, parameterized group are included using device generation, with all shapes at the top level, allowing the user to directly customize the device after generation. For example, this may be used to achieve some specific design for manufacturing (DFM) goals.

In other embodiments, complex, user controlled, programmable, combinations of devices may be included. This could be seen as a different approach to what is achieved by a model generator (MODGEN,) which is a constraint controlled combination of devices. In some embodiments, Programmable Array generation is included.

In some embodiments, there are two different possible implementations that may be used to capture the interaction between the body of code (i.e., the generator) and a container. The container is the group that contains the objects that have been generated. In the case of the viaStack, the container is the group of type "viaStack". The application (i.e., driver) can either pass the database identifier for the container to the generator code, and make the generator code responsible for populating the content of the container, or expect to get a list of specific objects from the generator and place them into the container itself. Passing the database identifier for the container to the generator code gives the most flexibility to the generator code, but also prevents the driving implementation from having tight control as to what is being placed into the container.

The embodiments may be used for any type of design activities, including hardware design, software design, and designs including both hardware and software such as hardware/software co-design activities. For example, some embodiments may be applied to the design of embedded software and systems, which includes communication systems such as encoders/decoders, automotive control systems such as ABS or cruise controllers, avionic controllers, as well as any other systems that includes embedded software.

Figure 12:
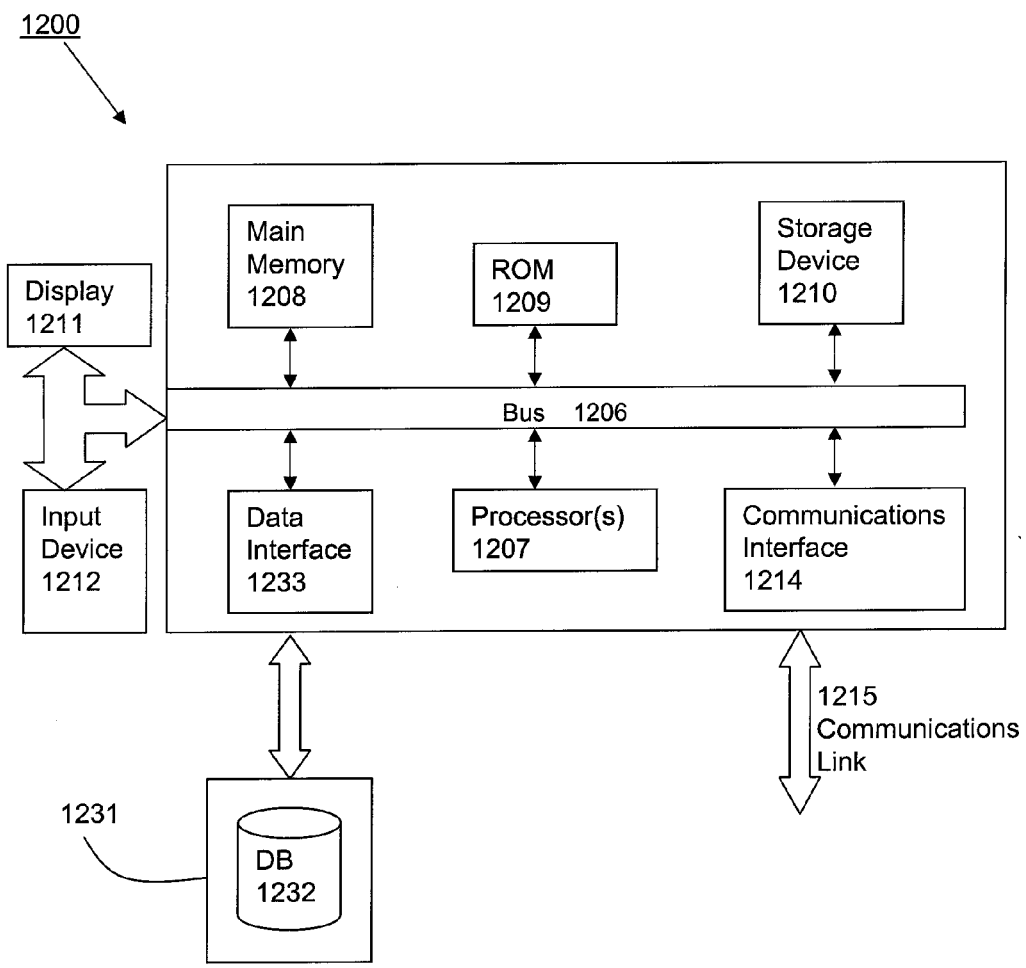
FIG. 12 depicts a computerized system on which a method for code generation may be implemented.

FIG. 12 depicts a computerized system on which a method for using via stacks may be implemented. The execution of the sequences of instructions required to practice the embodiments may be performed by a computer system 1200 as shown in FIG. 12. In an embodiment, execution of the sequences of instructions is performed by a single computer system 1200. According to other embodiments, two or more computer systems 1200 coupled by a communication link 1215 may perform the sequence of instructions in coordination with one another. Although a description of only one computer system 1200 will be presented below, however, it should be understood that any number of computer systems 1200 may be employed to practice the embodiments.

A computer system 1200 according to an embodiment will now be described with reference to FIG. 12, which is a block diagram of the functional components of a computer system 1200. As used herein, the term computer system 1200 is broadly used to describe any computing device that can store and independently run one or more programs.

Each computer system 1200 may include a communication interface 1214 coupled to the bus 1206. The communication interface 1214 provides two-way communication between computer systems 1200. The communication interface 1214 of a respective computer system 1200 transmits and receives electrical, electromagnetic or optical signals, which include data streams representing various types of signal information, e.g., instructions, messages and data. A communication link 1915 links one computer system 1200 with another computer system 1200. For example, the communication link 1215 may be a LAN, in which case the communication interface 1214 may be a LAN card, or the communication link 1215 may be a PSTN, in which case the communication interface 1214 may be an integrated services digital network (ISDN) card or a modem, or the communication link 1215 may be the Internet, in which case the communication interface 1214 may be a dial-up, cable or wireless modem.

A computer system 1200 may transmit and receive messages, data, and instructions, including program, i.e., application, code, through its respective communication link 1215 and communication interface 1214. Received program code may be executed by the respective processor(s) 1207 as it is received, and/or stored in the storage device 1210, or other associated non-volatile media, for later execution.

In an embodiment, the computer system 1200 operates in conjunction with a data storage system 1231, e.g., a data storage system 1231 that contain a database 1232 that is readily accessible by the computer system 1200. The computer system 1200 communicates with the data storage system 1231 through a data interface 1233. A data interface 1233, which is coupled to the bus 1206, transmits and receives electrical, electromagnetic or optical signals, which include data streams representing various types of signal information, e.g., instructions, messages and data. In embodiments, the functions of the data interface 1233 may be performed by the communication interface 1214.

Computer system 1200 includes a bus 1206 or other communication mechanism for communicating instructions, messages and data, collectively, information, and one or more processors 1207 coupled with the bus 1206 for processing information. Computer system 1200 also includes a main memory 1208, such as a random access memory (RAM) or other dynamic storage device, coupled to the bus 1206 for storing dynamic data and instructions to be executed by the processor(s) 1207. The main memory 1208 also may be used for storing temporary data, i.e., variables, or other intermediate information during execution of instructions by the processor(s) 1207.

The computer system 1200 may further include a read only memory (ROM) 1909 or other static storage device coupled to the bus 1206 for storing static data and instructions for the processor(s) 1207. A storage device 1210, such as a magnetic disk or optical disk, may also be provided and coupled to the bus 1206 for storing data and instructions for the processor(s) 1207.

A computer system 1200 may be coupled via the bus 1206 to a display device 1211, such as, but not limited to, a cathode ray tube (CRT), for displaying information to a user. An input device 1212, e.g., alphanumeric and other keys, is coupled to the bus 1206 for communicating information and command selections to the processor(s) 1207.

According to one embodiment, an individual computer system 1200 performs specific operations by their respective processor(s) 1207 executing one or more sequences of one or more instructions contained in the main memory 1208. Such instructions may be read into the main memory 1208 from another computer-usable medium, such as the ROM 1209 or the storage device 1210. Execution of the sequences of instructions contained in the main memory 1208 causes the processor(s) 1207 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1207. Such a medium may take many forms, including, but not limited to, non-volatile and volatile. Non-volatile media, i.e., media that can retain information in the absence of power, includes the ROM 1209, CD ROM, magnetic tape, and magnetic discs. Volatile media, i.e., media that cannot retain information in the absence of power, includes the main memory 1208.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than in a restrictive sense.

What is claimed is:

1. A computer implemented method comprising:
    defining a new technology object for the assemblage of vias to form a via stack, wherein the new technology object captures a relationship between different levels in the via stack;
    creating the via stack without introducing an extra level of hierarchy using the new technology object;
    providing an interface to manipulate the new technology object; and
    storing the manipulated new technology object.

2. The method of claim 1, wherein defining further comprising:
    defining a listing of formal parameters and default values;
    defining a listing of user defined parameters;
    defining a code, wherein the code describes how to combine the vias into the via stack; and
    creating the via stack.

3. The method of claim 1, wherein creating further comprising:
    executing code, wherein the code describes the combination of vias forming the via stack;
    computing a list of vias and rules captured by the code; and
    encapsulating the vias in the new technology object.

4. The method of claim 1, wherein providing further comprises:
    receiving a list at an editor;
    providing interface to the new technology object; and
    directly manipulating the via stack.

5. The method of claim 1, wherein the new technology object describes rules and cross level relationships for the vias.

6. The method of claim 1, wherein the via stack is available as a single object from the user perspective and comprises elements compatible with the functions of routing tools.

7. An apparatus comprising:
    a processor programmed for:
    defining a new technology object for the assemblage of vias to form a via stack, wherein the new technology object captures a relationship between different levels in the via stack;
    creating the via stack without introducing an extra level of hierarchy using the new technology object;
    providing an interface to manipulate the new technology object; and
    a volatile or non-volatile computer-usable medium for storing the manipulated new technology object.

8. The apparatus of claim 7, wherein defining further comprising:
    defining a listing of formal parameters and default values;
    defining a listing of user defined parameters;
    defining a code, wherein the code describes how to combine the vias into the via stack; and
    creating the via stack.

9. The apparatus of claim 7, wherein creating further comprising:
    executing code, wherein the code describes the combination of vias forming the via stack;
    computing a list of vias and rules captured by the code; and
    encapsulating the vias in the new technology object.

10. The apparatus of claim 7, wherein providing further comprises:
    receiving a list at an editor;
    providing interface to the new technology object; and
    directly manipulating the via stack.

11. A computer program product comprising instructions stored in a non-transitory computer readable medium which, when executed by a processor, causes the processor to execute a process, the process comprising:
    defining a new technology object for the assemblage of vias to form a via stack, wherein the new technology object captures a relationship between different levels in the via stack;
    creating the via stack without introducing an extra level of hierarchy using the new technology object;
    providing an interface to manipulate the new technology object; and
    storing the manipulated new technology object.

12. The product of claim 11, wherein defining further comprising:
    defining a listing of formal parameters and default values;
    defining a listing of user defined parameters;
    defining a code, wherein the code describes how to combine the vias into the via stack; and
    creating the via stack.

13. The product of claim 11, wherein creating further comprising:
    executing code, wherein the code describes the combination of vias forming the via stack;
    computing a list of vias and rules captured by the code; and
    encapsulating the vias in the new technology object.

14. The product of claim 11, wherein providing further comprises:
    receiving a list at an editor;
    providing interface to the new technology object; and
    directly manipulating the via stack.

* * * * *